United States Patent [19]

Ohya et al.

[11] Patent Number: 4,501,931
[45] Date of Patent: Feb. 26, 1985

[54] COLOR INFORMATION INPUT SYSTEM FOR ELECTRONIC BLACKBOARD

[75] Inventors: Nobumasa Ohya, Yokohama; Ryusaku Imai, Kawasaki; Hitoshi Sato, Yokohama, all of Japan

[73] Assignee: Fujitsu Limited, Kawasaki, Japan

[21] Appl. No.: 507,497

[22] Filed: Jun. 24, 1983

[30] Foreign Application Priority Data

Jun. 26, 1982 [JP] Japan ............................ 57-110267

[51] Int. Cl.³ ............................................ G08C 21/00
[52] U.S. Cl. .................................... 178/18; 340/701
[58] Field of Search .................... 178/18, 19, 20; 346/139 R, 49, 29; 33/18 R, 189; 340/701, 703, 706, 709; 364/431.01, 470

[56] References Cited

U.S. PATENT DOCUMENTS 4,135,245 1/1979 Kemplin et al. ............... 346/29 X
4,318,096 3/1982 Thornburg et al. ............ 178/18 X
4,424,572 1/1984 Lorig et al. .................... 340/703 X

FOREIGN PATENT DOCUMENTS 150268 8/1981 German Democratic Rep. .

OTHER PUBLICATIONS

European Search Report, Berlin, 2/13/1984.

Primary Examiner—Stafford D. Schreyer
Attorney, Agent, or Firm—Staas & Halsey

[57] ABSTRACT

A color information input system in which handwritten information, such as letters or figures, etc., is input on an entry area by being converted into electrical signals. In order to display the handwritten information in color, different colored pens are stocked in pen stockers, each pen stocker having a detector which outputs a detection signal when the pen is removed from the corresponding pen stocker. The pen being used on the entry area is detected when it is removed from its pen stocker and color information is generated from the detection signal and passed on to a display unit.

10 Claims, 7 Drawing Figures

COLOR INFORMATION INPUT SYSTEM FOR ELECTRONIC BLACKBOARD

BACKGROUND OF THE INVENTION

This invention relates to a color information input system for an electronic blackboard which inputs color information from pens of different colors to a display unit in an electronic blackboard. Handwritten information is transmitted to the display unit by inputting coordinates of the pen on the writing surface.

For the purpose of conducting a conference between remotely isolated conference rooms, a conference system has been developed in which a conference is carried out by connecting isolated conference rooms by telephone lines or leased lines and not only voice signals but also letter and figures are transmitted. In general, a blackboard is used in a conference. If the contents written on a blackboard can be transmitted, a large amount of information can be exchanged between isolated conference rooms. An electronic blackboard has been developed in order to provide such information exchange. This electronic blackboard includes an entry region with a coordinate detector. The coordinate detector detects the coordinates of a pen on the entry region and these coordinantes are transmitted to the display units of both conference rooms.

An electronic blackboard developed for the purpose described above will be explained with reference to FIG. 1. In FIG. 1, 11 and 21 are handwritten input boards having a tabulation function; 12 and 22 are pens such as felt pens for inputting handwritten input; 13 and 23 are dispay units such as a color projector or a CRT display; 14 and 24 are hard copy devices such as facsimile equipment; and 15 and 25 are communication control equipment. The handwritten input boards 11 and 21 each contain detection lines in the X and Y directions, respectively, and the pens 12 and 22 are provided with magnetic field signal generators. When a piece of information is handwritten with a pen 12 or 22 on the board, the voltage is induced in the detection lines in the X and Y directions of the handwritten input board 11 or 21 by the magnetic field from the magnetic field signal generator, and the voltage detected in the form of XY coordinates is recognized as the handwritten input information.

In another method described in the patent application with U.S. Ser. No. 238,961, now U.S. Pat. No. 4,418,242 assigned to the assignee of this invention, XY coils generate magnetic fields which differ in phase in accordance with their position in the handwritten input board 11 or 21. The magnetic field is detected by a sensor provided in the pens 12 and 22, then the phase of the detected magnetic field is compared with a reference phase and thereby the XY coordinate information is obtained.

This handwritten input information is transmitted to remote equipment through the communication control equipment 15 or 25. Therefore, a triangle entered on the handwritten input board 11, for example, is displayed on the local display unit 13 and the remote display unit 23. The displayed contents of display units 13 and 23 are output as hard copy by the hard copy units 14 and 24 as required.

Since handwritten input information can be transmitted within the voice frequency bandwidth, it can be transmitted through the telephone lines by frequency multiplexing it together with voice information. Accordingly, a conference between remote areas can be easily conducted using handwritten communication.

The handwritten content, however complicated it may be, can be easily understood by introducing various colors for input data on the handwritten input boards 11 and 12. For this purpose, it is necessary to input color information for the pens 12 and 22. One color information input method is to designate the colors by switches as disclosed, for example, in the Japanese Patent Publication No. 48359/1980. However, this method provides a disadvantage in that it is very troublesome to operate the switch in order to designate color during a conference and the color designated by the switch may sometimes differ from the actual color data because of erroneous operation. It may also be possible to connect the pens for respective colors to the handwritten input boards 11 and 12 through separate cords. The desired color information from the selected pen is designated by the cord. This method, however, also encounters a disadvantage in that the cords may become entangled because many cords are neccesary, thus degrading operability.

SUMMARY OF THE INVENTION

An object of this invention is to provide a color information input system which does not require any additional operations for inputting color information.

A second object of this invention is to provide a color information input system which does not deteriorate operability of an electronic blackboard.

The present invention is capable of generating color information by identifying the pen being used in order to meet such objects. This is accomplished by stocking pens of different colors in pen stockers. The removal of a pen from a pen stocker is detected by a detector corresponding to the pen stocker. The detector sends a signal indentifying the pen which has been removed and thus color information can be passed on to a display unit.

DESCRIPTION OF THE PREFERRED EMBODIMENT

Figure 1:
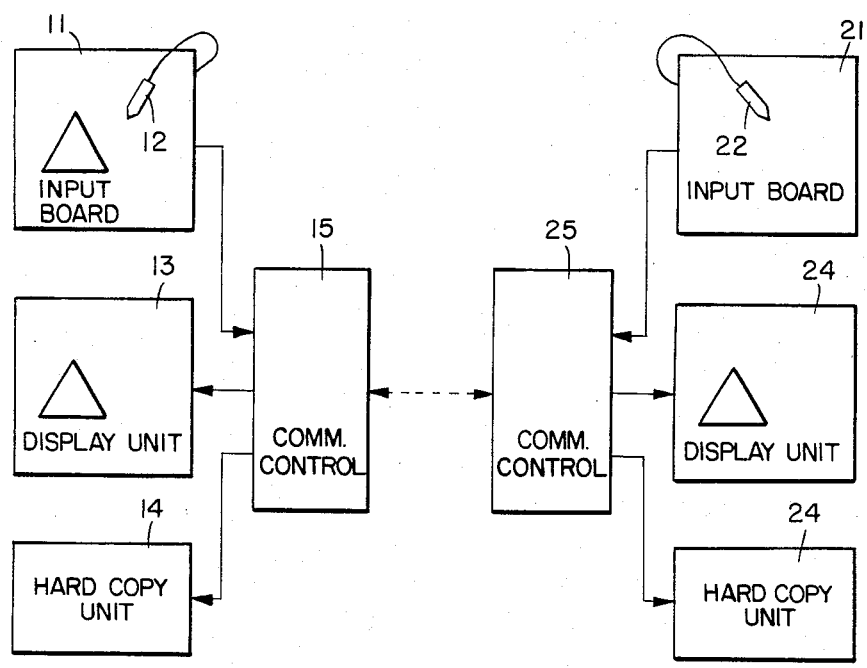
FIG. 1 is a block diagram of an electronic blackboard to which the present invention is applied.
Figure 2:
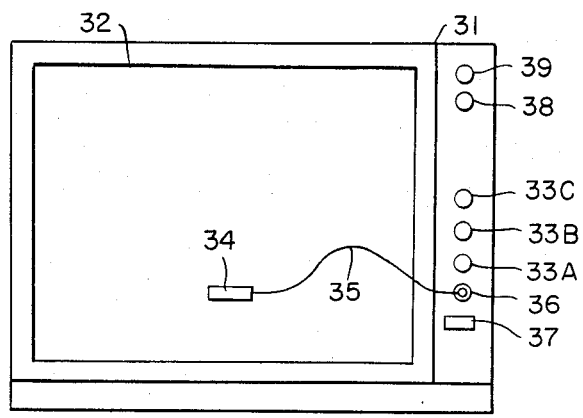
FIG. 2 is the front view of an embodiment of the present invention.

FIG. 2 is an outline of the front view of an embodiment of the present invention. The handwritten input board 31 includes the entry area 32 which is similar to a so-called white board with a plurality of detection lines in the X and Y directions on its rear side. The detection lines are scanned at a constant scan period. A writing instrument 34 includes a felt pen for entering data into the entry area 32 and a holder for holding the pen. Pen stockers 33A~33C are provided alongside the paper surface in order to stock the felt pens when they are removed from the holder. These pen stockers are capable of stocking felt pens having different colors. In this embodiment, three stockers are indicated, but it is of course possible to use more colors by providing more stockers. The line 35 is a cord, 36 is a connector, 37 is a power switch, and 38 and 39 are display lamps.

Figure 3:
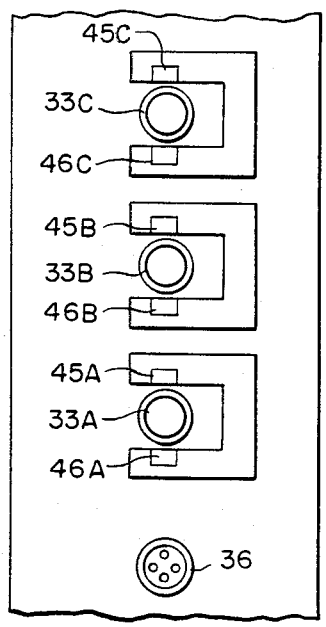
FIG. 3 is a pen stocker and detector unit in the embodiment of the present invention.

FIG. 3 illustrates the pen stockers 33A-C and detectors. These detectors are composed of the light sources 45A~45C and light sensors 46A 46C. When a felt pen is stocked, for example in pen stocker 33 (that is, in the board pen holder), the light emitted from the light source 45 does not enter the light sensor 46, but when the felt pen is taken out of the pen stocker 33, light enters the sensor 46. Thereby, the felt pen which is currently in use can be determined by detecting outputs of the light sensors 46A-C.

In the above example, the detector is configured for optical detection, but it is of course possible to mechanically detect the use (absence) of a pen. It is also possible to issue an alarm if two or more pens are used, or to allow access to only one felt pen at a time by providing a mechanical lock.

Figure 4:
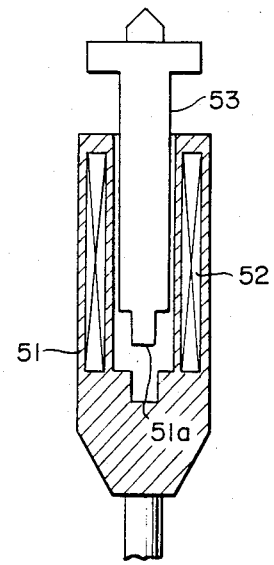
FIG. 4 is a cross-sectional view of a pen.

FIG. 4 is a cross-sectional view of a pen in a holder 51 having a magnetic field generator coil 52. 53 is a so-called felt pen of the desired color and it is removably mounted in the holder 51. During operation, the color of the felt pen can be identified from the detection signal of the detector (light sensor) by mounting a felt pen 53 taken out of a pen stocker into the space 51a in the holder 51. The content of handwritten information can then be obtained as the handwritten information by detecting the magnetic field generated by the coil 52.

Figure 5:
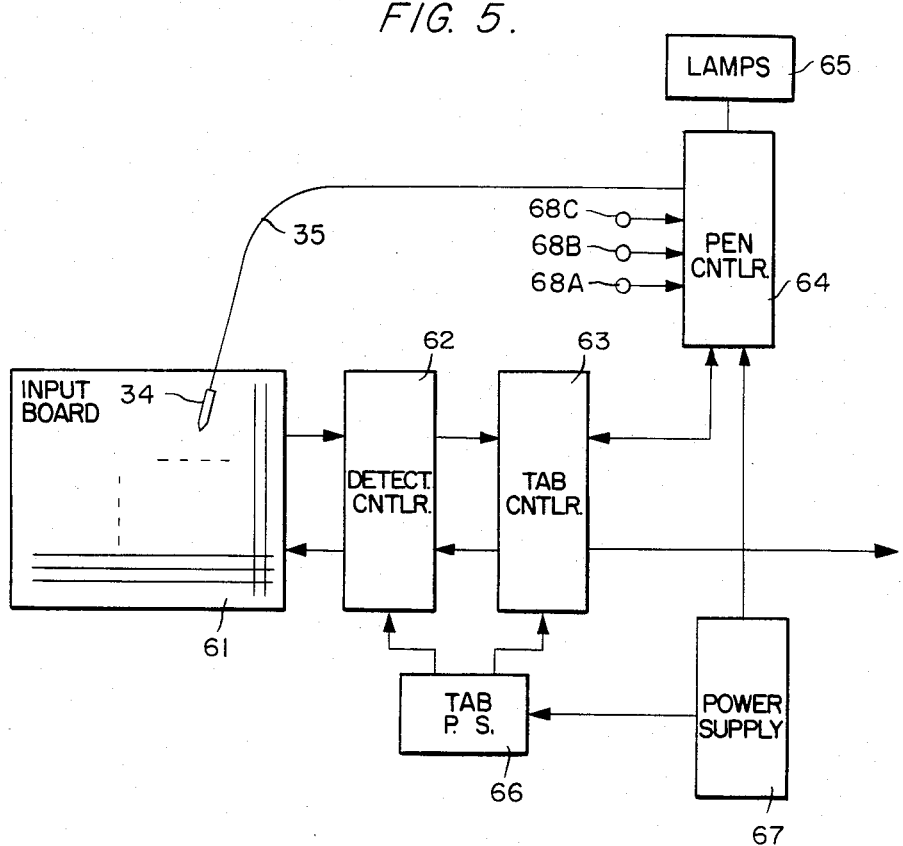
FIG. 5 is a block diagram of a controller in the embodiment of the present invention.

FIG. 5 is a block diagram of the major parts of this embodiment of the present invention. The tabulator 61 of the handwritten input board contains detection lines arranged in the X and Y directions at intervals in accordance with the desired detection resolution. The magnetic field generated by the magnetic field generator coil 52 of the holder 51 is detected by the tabulator 61. The detection controller 62 scans the detection lines to find the detection lines with the highest signal levels and then transfers the X and Y coordinates thus obtained to the tabulation controller 63.

The pen controller 64 controls the magnetic field generator 52 and transfers the color information to the tabulation controller 63 in accordance with the detected information sent from the pen detectors 68A~68C. The lamp indicator 65 indicates power ON, handwritten input ready and alarm with lamps. The tabulator power supply 66 supplies power for operation to the detection controller 62 and the tabulation controller 63 and is provided with a noise eliminator. The power supply 67 has a structure for supplying power from an AC power source and operates when the power switch 37 of FIG. 2 is turned ON.

The tabulation controller 63 receives data from the detection controller 62 and the pen controller 64 and transfers the coordinate information and the color information of the felt pen to the communication controller. For transmitting a signal over a telephone line, the communication controller is capable of transmitting handwritten input information together with voice communication by differential coding of the handwritten input information with the frequencies of 1.9~2.3 kHz within the voice band frequency of 0.3~3.4 kHz. On the receiving end, the voice information and handwritten input information are separated by a filter and only the handwritten input information is applied to the display unit and displayed thereon. At this time, since the color information is also transmitted, color pictures can be displayed on the display unit.

When a desired felt pen is taken out of its pen stocker 33, it is detected by one of the detectors 68A~68C and the detection signal is input to the pen controller 64. Thereafter, when the selected felt pen is mounted in the holder 51 and information is written on the tabulator 61 therewith, the magnetic field from the magnetic field generator 52 provided in the holder 51 is detected by the detection controller 62, as explained above, and then input to the tabulation controller 63. The tabulation controller 63 combines the X and Y coordinates sent from the detection controller 62 and the color information sent from the pen controller 64 and then transmits the signal serially to the display units of the local system and the remote system.

Figure 6:
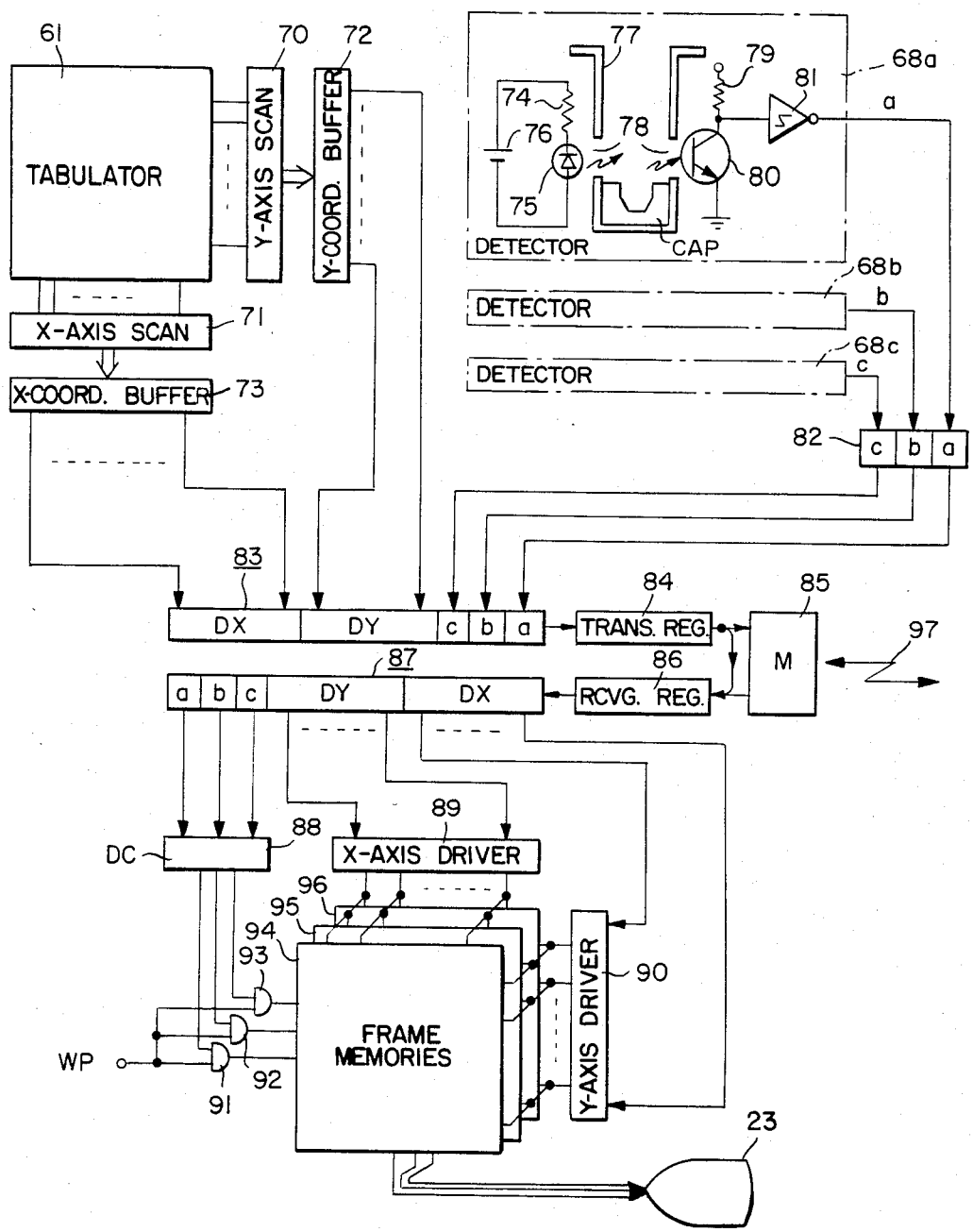
FIG. 6 is a detailed block diagram of FIG. 5.

FIG. 6 is an example of the present invention. In this FIG. 6, 70 is a Y-axis scanner; 71 is an X-axis scanner; 72 is a Y-coordinate buffer; 73 is an X-coordinate buffer; 74 is a LED adjusting resistor; 75 is an LED; 76 is a power supply; 77 is a pen stocker case; 78 is an aperture; 79 is a photo-transistor adjusting resistor; 80 is a photo-transistor; 81 is a comparator; 82 is a color information buffer; 83 is a transmitting buffer; 84 is transmitting first-in and first-out register; 85 is a modem; 86 is a receiving first-in and first-out register; 87 is a receiving buffer; 88 is a decoder; 89 is an X-axis driver; 90 is a Y-axis driver; 91~93 are AND gates; 94 is a red frame memory; 95 is a blue frame memory; 96 is a green frame memory; and CAP is a cap which prevents the felt pen from drying out.

First, the XY coordinates are detected by the X- and Y-axis scanners 71 and 70, respectively. The X and Y coordinates are then input to the X- and Y-axis coordinate buffers 73 and 72, respectively. The coodinates in the Y-coordinate buffer 72 and X-coordinate buffer 73 are input in parallel to the domains DX and DY of the transmitting buffer 83.

Color information is input in the following manner. In this embodiment, pen detector 68a is designated for a red felt pen, 68b for a blue felt pen and 68c for a green felt pen. An LED 75 and a photo-transistor 80 are provided face to face at the aperture 78 of the pen stocker case 77, and the LED 75 always allows a current to flow from the power supply 76 through the adjusting resistor 74.

When a felt pen is taken out of the pen stocker case 77, the light emitted from the LED 75 enters the photo-transistor 80. Thereby, the photo-transistor 80 turns ON, reducing the collector voltage level. This collector voltage level is compared with a reference value by the comparator 81. When it drops below the reference value, the color signal a is sent to the domain a of the color information buffer 82. Similarly, the color signal b is sent from the pen detector 68b to the domain b of the color information buffer 82 and the color signal c is sent from the pen detector 68c to the domain c.

The content of the color information buffer 82 are input in parallel to the domains a, b and c of the transmitting buffer 83. When all of the domains DX, DY, a, b and c have received information, the transmitting buffer 83 inputs them serially to the modem 85 through the transmitting first-in and first-out register 84 and simultaneously inputs them sequentially to the receiving first-in and first-out register 86. The modem 85 modulates the input X-coordinate signal, Y-coordinate signal and color signal and then sends them over the line 97. Meanwhile, the contents of the receiving first-in and first-out register 86 is serially input to the receiving buffer 87.

The color information of the domains a~c is decoded by the decoder 88 and opens the corresponding AND gate 91~93. Thereby, the write pulse WP is passed to the corresponding memory 94~96. The Y-coordinate signal in the domain DY of the receiving buffer 87 is transferred to the Y-axis driver 90, while the X-coordinate signal in the domain DX is transferred to the X-axis driver 89. Data is thus entered in the frame memory to which the write pulse WP is passed.

While the above operations occur, the rest of the electronic blackboard is also operating. Receiving information sent from the remote system is demodulated by the modem 85 and is transferred to the receiving buffer 87 through the receiving first-in and first-out register 86. Contents of the frame memories 94~96 are read periodically and displayed on the display unit 23. A half-duplex communication system is employed for communication with the remote system. Therefore, handwritten information for the local system and the remote system do not collide within the receiving first-in and first-out register 86.

Figure 7:
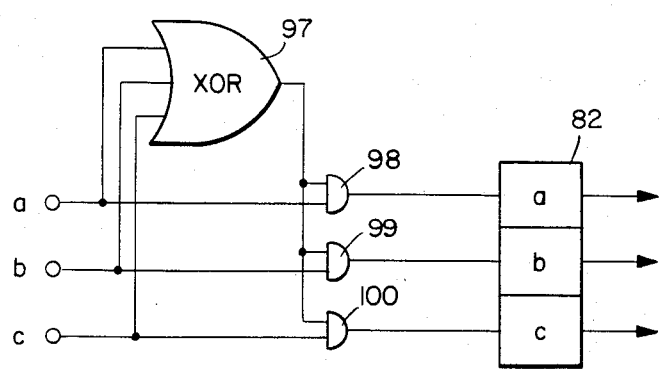
FIG. 7 is a block diagram of a circuit which prevents two or more color signals from being sent.

FIG. 7 is an example of a circuit for inhibitting two or more color signals from being sent. In this figure, 97 is an exclusive-OR gate and 98~100 are AND gates. The exclusive-OR gate 97 sends a high level output to the AND gates 98~100 only when just one of the color signals a~c is being output. Therefore, the color information is input to the respective domain a~c of the color information buffer 82.

As explained previously, in the present invention, the writing instrument for an electronic blackboard is composed of a holder and a felt pen. In addition, a pen stocker 33 which accommodates the felt pen is provided with a detector and the color of the felt pen used can be determined from the detection signal of the detector. Accordingly, color information can be automatically and accurately obtained. Since only one holder is necessary, the cord of the holder will not become entangled with another cord. Moreover, data entry can be easily made to the entry area of the handwritten input board.

We claim:

1. A color information input system for an electronic blackboard which accepts hand written information generated on an entry area by pens of different colors and displays the hand written information on a display unit, comprising:
   pen stockers for stocking the pens of different colors;
   detectors, each of said detectors provided for a corresponding pen stocker and generating a detection signal indicating whether one of said pens is stocked in said corresponding pen stocker;
   a color information generator, operatively connected to said detectors, for generating color information in accordance with the detection signal from each of said detectors; and
   a holder, for holding a pen selected from said pen stockers while generating the hand written information, comprising a signal generator for generating a signal;
   a position coordinate sensor for detecting coordinates of the signal generated by the signal generator in said holder while on the entry area and generating coordinate information; and
   transmitting means, operatively connected to said color information generator, said position coordinate sensor and the display unit, for transmitting color and coordinate information to the display unit, said transmitting means changing the color information transmitted when one of said detectors detects that the selected pen has been taken out of said corresponding pen stocker and, color information for the selected pen is generated by said color information generator and input to said transmitting means.

2. A color information input system for an electronic blackboard according to claim 1, wherein each of said detectors comprises:
   a light emitting element; and
   a light detecting element for detecting light emitted from said light emitting element.

3. A color information input system for an electronic blackboard according to claim 1, wherein the pens have points and each of said pen stockers comprises:
   a hollow cylindrical body having one end open; and
   a cap, provided at a closed end of said cylindrical body, for engaging the point of the pen stocked in said pen stocker.

4. A color information input system for an electronic blackboard according to claim 3, wherein said hollow cylindrical body in each of said pen stockers has first and second holes diametrically opposite to each other, and each of said detectors comprises:
   a light emitting element for transmitting light through the first and second holes; and
   a light detecting element, aligned with the second hole, for detecting light transmitted by said light emitting element.

5. A color information input system for an electronic blackboard according to claim 1,
   wherein the coordinate information generated by said position coordinate sensor comprises an X-coordinate signal and a Y-coordinate signal, and
   wherein said transmitting means comprises:
      a transmitting register buffer, operatively connected to said color information generator and said position coordinate sensor, comprising an X-coordinate domain for storing the X-coordinate signal, a Y-coordinate domain for storing the Y-coordinate signal and a color information domain for storing the detection signal sent from said detectors;
      communicating means, operatively connected to said transmitting register buffer, for serially transmitting the contents of said transmitting register;
      a receiving register buffer comprising an X-coordinate domain for storing the X-coordinate signal, a Y-coordinate domain for storing the Y-coordinate signal, and a color information domain for storing the detection signal;
      receiving means, operatively connected to said communicating means and said receiving register buffer, for storing the contents of said transmitting register buffer in said receiving register buffer;
      frame memories, operatively connected to the display unit, for storing the hand written information to be displayed;
      selecting means, operatively connected to said receiving register buffer and said frame memories, for selecting one of said frame memories corresponding to the color of the selected pen in accordance with the color information domain of said receiving register buffer; and a driver, operatively connected to said receiving register buffer and said frame memories, for writing hand written information in the X-coordinate and Y-coordinate domains of said receiving register buffer.

6. A color electronic blackboard, comprising:
input means for inputting hand written information and color information, comprising:
pens of different colors;
pen stockers, each of said pen stockers for stocking one of said pens of different colors;
detectors, each of said detectors provided for a corresponding pen stocker and generating a detection signal when the corresponding pen stocker is empty;
a color information generator, operatively connected to said detectors, for generating color information in accordance with the detection signal from each of said detectors;
an entry area for entering the hand written information;
coordinate sensing means in said entry area for sensing coordinates of a selected pen, selected from said pen stockers, while the selected pen is generating the hand written information on said entry area; and
transmitting means, operatively connected to said color information generator and said coordinate sensing means, for transmitting the hand written and color information;
receiving means, operatively connected to said transmitting, means for receiving the hand written and color information from said transmitting means; and
display means, operatively connected to said receiving means, for displaying the hand written information in colors specified by the color information.

7. A color electronic blackboard as recited in claim 6, wherein said display means comprises:
frame memories for storing the hand written information;
selecting means, operatively connected to said receiving means and said frame memories, for selecting one of said frame memories in accordance with the color information received by said receiving means;
writing means, operatively connected to said receiving means and said frame memories, for writing the hand written information to the frame memory selected by said selecting means; and
a display unit, operatively connected to said frame memories, for displaying the hand written information stored in said frame memories.

8. A color electronic blackboard as recited in claim 6, further comprising communicating means, operatively connected to said transmitting means and operatively connectable to receiving means of a second color electronic blackboard, for transmitting and receiving color and hand written information to and from the second color electronic blackboard.

9. A color electronic blackboard as recited in claim 6, wherein each of said detectors comprises:
a light emitting element; and
a light detecting element for detecting light emitted from said light emitting element.

10. A color electronic blackboard as recited in claim 9,
wherein each of said pen stockers comprises a hollow cylindrical body having first and second holes located diametrically opposite each other, and
wherein the light emitting element of each of said detectors is aligned with the first hole of the corresponding pens stocker and the light detecting element of each of said detectors is aligned with the second hole of the corresponding pen stocker.

* * * * *